United States Patent
Hethcock, Jr.

(10) Patent No.: US 11,891,172 B2
(45) Date of Patent: Feb. 6, 2024

(54) DEVICES AND METHODS TO ATTACH A COMPOSITE CORE TO A SURROUNDING STRUCTURE

(71) Applicant: Sierra Nevada Corporation, Sparks, NV (US)

(72) Inventor: James Donn Hethcock, Jr., Colleyville, TX (US)

(73) Assignee: SIERRA NEVADA CORPORATION, Sparks, NV (US)

(*) Notice: Subject to any disclaimer, the term of this patent is extended or adjusted under 35 U.S.C. 154(b) by 0 days.

(21) Appl. No.: 17/453,803

(22) Filed: Nov. 5, 2021

(65) Prior Publication Data
US 2022/0161922 A1 May 26, 2022

Related U.S. Application Data

(62) Division of application No. 16/014,466, filed on Jun. 21, 2018, now Pat. No. 11,167,836.

(51) Int. Cl.
*B64C 3/26* (2006.01)
*B64C 3/20* (2006.01)
(Continued)

(52) U.S. Cl.
CPC .................. *B64C 3/26* (2013.01); *B32B 3/12* (2013.01); *B32B 27/08* (2013.01); *B64C 3/185* (2013.01);
(Continued)

(58) Field of Classification Search
CPC ........... B64C 3/185; B64C 3/20; B64C 1/064; B32B 3/06; B29C 70/72
See application file for complete search history.

(56) References Cited

U.S. PATENT DOCUMENTS

| 1,376,785 A | 5/1921 | Sellmer |
| D97,652 S | 11/1935 | Swanson |

(Continued)

FOREIGN PATENT DOCUMENTS

| EP | 0891858 | 1/1999 |
| EP | 1338506 A1 | 8/2003 |

(Continued)

OTHER PUBLICATIONS

Information Submitted in Parent Patent Applications, see MPEP 609.02 and the section below having the same title.
(Continued)

*Primary Examiner* — Christopher D Hutchens
(74) *Attorney, Agent, or Firm* — HOLLAND & HART LLP

(57) ABSTRACT

A composite core assembly includes a composite core structure having internal material interfaces and an attachment rail coupled to the composite core structure. The attachment rail includes a first planar surface and a second planar surface adjoined with the first planar surface. The first planar surface is arranged parallel to an internal material interface plane of the composite core structure, and the first planar portion is at least partially integrated into the composite core structure in an internal material interface plane. At least a portion of the first planar surface extends beyond a perimeter surface of the composite core structure, and the second planar surface is configured to attach to the surrounding support member. The core material does not have net edge facets or flat edges positioned next to surrounding structure, and/or may not have a structure arranged parallel to the adjacent support structure to attach to the support structure.

7 Claims, 10 Drawing Sheets

(51) Int. Cl.
  *B64C 3/18*    (2006.01)
  *B32B 3/12*    (2006.01)
  *B32B 27/08*   (2006.01)

(52) U.S. Cl.
  CPC ............... *B64C 3/187* (2013.01); *B64C 3/20* (2013.01); *B32B 2605/18* (2013.01)

(56) References Cited

U.S. PATENT DOCUMENTS

| | | |
|---|---|---|
| D133,634 S | 9/1942 | Hurzzard et al. |
| D136,664 S | 11/1943 | White |
| D143,864 S | 2/1946 | Northrop |
| 2,501,920 A | 3/1950 | Steigel |
| 2,938,680 A | 5/1960 | Greene et al. |
| 3,017,139 A | 1/1962 | Binder |
| D192,583 S | 4/1962 | Walker et al. |
| 3,049,320 A | 8/1962 | Fletcher |
| D194,645 S | 2/1963 | Raspet |
| D197,933 S | 4/1964 | Sumner |
| D201,284 S | 6/1965 | Bross et al. |
| 3,310,262 A | 3/1967 | Robins et al. |
| 3,360,217 A | 12/1967 | Trotter |
| 3,392,225 A | 7/1968 | Phelan |
| 3,415,467 A | 12/1968 | Barringer |
| 3,438,597 A | 4/1969 | Kasper |
| D218,856 S | 9/1970 | Fellers et al. |
| D218,857 S | 9/1970 | Walter et al. |
| 3,564,134 A | 2/1971 | Rue et al. |
| D220,982 S | 6/1971 | Webb |
| D221,696 S | 8/1971 | Kirivka |
| D231,603 S | 5/1974 | Kirivka |
| D231,604 S | 5/1974 | Kirivka |
| 3,916,560 A | 11/1975 | Becker |
| 4,008,867 A | 2/1977 | Kaniut |
| D246,168 S | 10/1977 | Landrus |
| 4,206,895 A | 6/1980 | Olez |
| D256,347 S | 8/1980 | McComas |
| D256,905 S | 9/1980 | McComas et al. |
| D257,338 S | 10/1980 | McComas et al. |
| D264,454 S | 5/1982 | Snyder |
| 4,372,507 A | 2/1983 | Denniston |
| 4,415,132 A | 11/1983 | Shirk |
| D274,510 S | 7/1984 | McComas et al. |
| D281,680 S | 12/1985 | Henderson |
| 4,569,493 A | 2/1986 | Burhans, Jr. |
| 4,687,691 A | 8/1987 | Kay |
| 4,710,708 A | 12/1987 | Rorden et al. |
| 4,712,352 A | 12/1987 | Low |
| D298,026 S | 10/1988 | Judge |
| 4,811,540 A * | 3/1989 | Kallies ................... B64C 1/068 52/630 |
| 4,869,443 A | 9/1989 | Skow |
| 4,896,846 A | 1/1990 | Strom |
| 4,966,802 A * | 10/1990 | Hertzberg ............. B29C 66/112 428/113 |
| 4,979,699 A | 12/1990 | Tindell |
| 5,039,032 A | 8/1991 | Rudolph |
| D319,805 S | 9/1991 | Wiegert |
| D323,315 S | 1/1992 | Haga |
| D326,255 S | 5/1992 | Graham et al. |
| 5,111,400 A | 5/1992 | Yoder |
| 5,115,996 A | 5/1992 | Moller |
| 5,118,052 A | 6/1992 | Alvarez Calderon |
| D332,080 S | 12/1992 | Sandusky et al. |
| 5,192,037 A | 3/1993 | Moorefield |
| 5,274,846 A | 1/1994 | Kolsky |
| 5,379,969 A | 1/1995 | Marx et al. |
| D356,990 S | 4/1995 | Weir et al. |
| 5,407,150 A | 4/1995 | Sadleir |
| 5,425,515 A | 6/1995 | Hirose |
| 5,496,001 A | 3/1996 | Skow |
| D371,105 S | 6/1996 | Graham et al. |
| 5,574,648 A | 11/1996 | Pilley |
| 5,716,032 A | 2/1998 | McIngvale |
| D392,937 S | 3/1998 | Brichard et al. |
| 5,735,486 A * | 4/1998 | Piening ................... B64C 3/20 244/133 |
| 5,842,666 A | 12/1998 | Gerhardt et al. |
| 5,890,079 A | 3/1999 | Levine |
| 5,922,446 A * | 7/1999 | Piening ................... B64C 3/20 428/292.1 |
| 5,924,649 A * | 7/1999 | Piening ................... B64C 1/26 416/241 A |
| 5,927,645 A | 7/1999 | Latz |
| 5,984,229 A | 11/1999 | Hollowell et al. |
| D418,105 S | 12/1999 | Margaritoff |
| D418,805 S | 1/2000 | Cycon et al. |
| D431,522 S | 10/2000 | Fujino |
| 6,147,980 A | 11/2000 | Yee et al. |
| 6,173,159 B1 | 1/2001 | Wright et al. |
| 6,176,451 B1 | 1/2001 | Drymon |
| D439,876 S | 4/2001 | Simonov et al. |
| 6,260,797 B1 | 7/2001 | Palmer |
| D446,764 S | 8/2001 | Panatov et al. |
| 6,338,011 B1 | 1/2002 | Furst et al. |
| 6,355,337 B1 * | 3/2002 | Piening ................... B64C 1/12 428/292.1 |
| 6,394,722 B1 | 5/2002 | Kunt et al. |
| D458,577 S | 6/2002 | Han |
| D464,604 S | 10/2002 | Jamgarov |
| D467,217 S | 12/2002 | Andreyko |
| D468,255 S | 1/2003 | Gopalaswami et al. |
| 6,677,888 B2 | 1/2004 | Roy |
| 6,799,114 B2 | 9/2004 | Etnyre |
| 6,806,829 B2 | 10/2004 | Smith et al. |
| 6,857,601 B2 | 2/2005 | Akahori |
| 6,908,061 B2 | 6/2005 | Akahori |
| 6,995,688 B2 | 2/2006 | Reynolds |
| 7,037,568 B1 | 5/2006 | Rogers et al. |
| 7,070,146 B2 | 7/2006 | Morgenstern et al. |
| 7,130,741 B2 | 10/2006 | Bodin et al. |
| 7,228,232 B2 | 6/2007 | Bodin et al. |
| 7,252,263 B1 | 8/2007 | Hagemeister et al. |
| 7,269,513 B2 | 9/2007 | Herwitz |
| D613,202 S | 4/2010 | Rodriquez et al. |
| D621,774 S | 8/2010 | Betsch |
| 7,782,256 B2 | 8/2010 | Smith |
| D629,737 S | 12/2010 | Betsch |
| D649,506 S | 11/2011 | Morelli |
| D651,156 S | 12/2011 | Gundlach |
| 8,089,033 B2 | 1/2012 | Zank et al. |
| D665,331 S | 8/2012 | Sands |
| 8,342,447 B2 | 1/2013 | Etling |
| 8,444,082 B1 | 5/2013 | Foch |
| D690,254 S | 9/2013 | Manzhelii |
| D708,563 S | 7/2014 | Colten |
| D710,782 S | 8/2014 | Cummings |
| D713,321 S | 9/2014 | Cummings |
| D713,774 S | 9/2014 | Tritschler et al. |
| D717,227 S | 11/2014 | Herzberger et al. |
| D729,694 S | 5/2015 | Earon |
| D734,402 S | 7/2015 | Reznik |
| D739,807 S | 9/2015 | Strand et al. |
| 9,168,996 B2 * | 10/2015 | Haensch ............... B64C 1/1461 |
| D743,868 S | 11/2015 | Cummings et al. |
| 9,180,974 B2 | 11/2015 | Pogosyan et al. |
| 9,284,046 B2 | 3/2016 | Lucchesini et al. |
| 9,387,926 B2 | 7/2016 | Sommer |
| 9,452,820 B1 | 9/2016 | Wirth |
| 9,505,484 B1 | 11/2016 | Al-Sabah |
| 9,507,346 B1 | 11/2016 | Levinson et al. |
| 9,527,596 B1 | 12/2016 | Adams |
| 9,545,991 B1 | 1/2017 | Alley et al. |
| 9,681,527 B2 | 6/2017 | Foltz et al. |
| D795,160 S | 8/2017 | Koppenwallner |
| 9,725,155 B2 | 8/2017 | Miller et al. |
| 9,777,502 B2 | 10/2017 | Curlander et al. |
| 9,783,284 B2 | 10/2017 | Townsend et al. |
| D801,856 S | 11/2017 | Zhou |
| D803,724 S | 11/2017 | Zhou |
| 9,815,545 B1 | 11/2017 | Steer |
| D807,273 S | 1/2018 | Koppenwallner |
| D808,328 S | 1/2018 | Ivans et al. |

(56) References Cited

U.S. PATENT DOCUMENTS

| | | |
|---|---|---|
| D809,970 S | 2/2018 | Zhou |
| D810,621 S | 2/2018 | Sadek |
| D813,143 S | 3/2018 | Belik et al. |
| D824,804 S | 8/2018 | Tian |
| 10,042,359 B1 | 8/2018 | Konrardy et al. |
| 10,046,850 B2 | 8/2018 | Gamble et al. |
| 10,124,880 B1 | 11/2018 | Ellzey et al. |
| 10,124,890 B2 | 11/2018 | Sada-Salinas et al. |
| 10,207,793 B2 | 2/2019 | Gonzalez et al. |
| 10,706,729 B2 | 7/2020 | Cao et al. |
| 10,710,710 B2 | 7/2020 | Price |
| 10,974,809 B2 | 4/2021 | Finklea et al. |
| 2002/0066825 A1 | 6/2002 | Miralles et al. |
| 2002/0075179 A1 | 6/2002 | Hudson et al. |
| 2003/0089820 A1 | 5/2003 | Martorana et al. |
| 2003/0094536 A1 | 5/2003 | Labiche |
| 2003/0114115 A1 | 6/2003 | Overy et al. |
| 2004/0011927 A1 | 1/2004 | Christman et al. |
| 2004/0048027 A1* | 3/2004 | Hayes .............. B29C 64/10 428/116 |
| 2004/0148067 A1 | 7/2004 | Griffith et al. |
| 2004/0159227 A1 | 8/2004 | Richards |
| 2004/0232285 A1 | 11/2004 | Akahori |
| 2005/0029402 A1 | 2/2005 | Lucchesini et al. |
| 2005/0045763 A1 | 3/2005 | Morgenstern et al. |
| 2005/0121555 A1 | 6/2005 | Morgenstern et al. |
| 2005/0200501 A1 | 9/2005 | Smith |
| 2005/0274845 A1 | 12/2005 | Miller et al. |
| 2006/0032978 A1 | 2/2006 | Matos et al. |
| 2006/0185305 A1 | 8/2006 | Schaffer |
| 2006/0197700 A1 | 9/2006 | Stevens et al. |
| 2006/0253254 A1 | 11/2006 | Herwitz |
| 2007/0222665 A1 | 9/2007 | Koeneman |
| 2007/0252760 A1 | 11/2007 | Smith et al. |
| 2008/0033604 A1 | 2/2008 | Margolin |
| 2008/0055149 A1 | 3/2008 | Rees et al. |
| 2008/0158041 A1 | 7/2008 | Crudeli et al. |
| 2008/0191942 A1 | 8/2008 | Smith et al. |
| 2008/0201024 A1 | 8/2008 | Matos |
| 2008/0213034 A1* | 9/2008 | Wood .............. F16B 5/01 403/122 |
| 2008/0215204 A1 | 9/2008 | Roy et al. |
| 2008/0221745 A1 | 9/2008 | Diamandis et al. |
| 2008/0243314 A1 | 10/2008 | Ridenour |
| 2008/0255711 A1 | 10/2008 | Matos |
| 2009/0012657 A1 | 1/2009 | Knotts et al. |
| 2009/0026804 A1 | 1/2009 | Ciprian |
| 2009/0206196 A1 | 8/2009 | Parks et al. |
| 2009/0222148 A1 | 9/2009 | Knotts et al. |
| 2009/0302151 A1 | 12/2009 | Holmes |
| 2010/0004799 A1 | 1/2010 | Drouin et al. |
| 2010/0006702 A1 | 1/2010 | Fogarty et al. |
| 2010/0051742 A1 | 3/2010 | Schweighart et al. |
| 2010/0224732 A1 | 9/2010 | Olson et al. |
| 2010/0264260 A1 | 10/2010 | Hammerquist |
| 2010/0320325 A1 | 12/2010 | Parikh et al. |
| 2011/0095572 A1 | 4/2011 | Wary |
| 2011/0130913 A1 | 6/2011 | Duggan et al. |
| 2011/0135887 A1 | 6/2011 | Saff et al. |
| 2011/0315300 A1 | 12/2011 | Weidmann et al. |
| 2012/0021165 A1 | 1/2012 | Hethcock et al. |
| 2012/0043429 A1 | 2/2012 | Tracy et al. |
| 2012/0205490 A1 | 8/2012 | Whitehouse et al. |
| 2012/0234979 A1 | 9/2012 | Smith |
| 2012/0280080 A1 | 11/2012 | Lubenow et al. |
| 2012/0292436 A1 | 11/2012 | Karem |
| 2013/0196593 A1 | 8/2013 | Roper et al. |
| 2013/0299636 A1* | 11/2013 | Durand .............. B64C 1/26 244/123.1 |
| 2014/0070056 A1 | 3/2014 | Merlo et al. |
| 2014/0120298 A1 | 5/2014 | Thiagarajan et al. |
| 2014/0141769 A1 | 5/2014 | Brisebois et al. |
| 2014/0145027 A1 | 5/2014 | Pogosyan et al. |
| 2014/0265043 A1 | 9/2014 | Oldroyd et al. |
| 2014/0281534 A1 | 9/2014 | Mccormack et al. |
| 2014/0293497 A1 | 10/2014 | Foltz et al. |
| 2014/0295123 A1 | 10/2014 | Mizuno et al. |
| 2014/0301856 A1 | 10/2014 | Oldroyd et al. |
| 2015/0008280 A1 | 1/2015 | Smoker |
| 2015/0032293 A1 | 1/2015 | O'Neill et al. |
| 2015/0036514 A1 | 2/2015 | Zhu et al. |
| 2015/0102155 A1 | 4/2015 | Krastev |
| 2015/0174819 A1 | 6/2015 | Hethcock et al. |
| 2015/0266578 A1 | 9/2015 | Elkins et al. |
| 2015/0293845 A1 | 10/2015 | Hsu et al. |
| 2015/0360764 A1* | 12/2015 | Eales .............. B64C 3/185 244/131 |
| 2015/0362005 A1 | 12/2015 | Meyers |
| 2016/0137307 A1 | 5/2016 | Fernandez |
| 2016/0155339 A1 | 6/2016 | Saad et al. |
| 2016/0185449 A1 | 6/2016 | Baker |
| 2016/0266733 A1 | 9/2016 | Alon et al. |
| 2016/0311190 A1* | 10/2016 | Hundley .............. E04C 2/292 |
| 2016/0340021 A1 | 11/2016 | Zhang et al. |
| 2016/0347476 A1 | 12/2016 | Andryukov |
| 2017/0001724 A1 | 1/2017 | Yates |
| 2017/0182730 A1 | 6/2017 | Kendrick et al. |
| 2017/0225769 A1* | 8/2017 | Carlson .............. B29C 70/302 |
| 2017/0355441 A1 | 12/2017 | Winkelmann et al. |
| 2017/0369150 A1 | 12/2017 | Finklea et al. |
| 2018/0072400 A1* | 3/2018 | Deobald .............. B64C 1/064 |
| 2018/0136651 A1 | 5/2018 | Levinson et al. |
| 2018/0201008 A1 | 7/2018 | Pierce et al. |
| 2018/0229443 A1* | 8/2018 | Pham .............. B29C 70/026 |
| 2018/0231977 A1 | 8/2018 | Uno |
| 2019/0011912 A1 | 1/2019 | Lockwood et al. |
| 2019/0186918 A1 | 6/2019 | Suen et al. |
| 2019/0232602 A1 | 8/2019 | Wolf et al. |
| 2020/0012274 A1 | 1/2020 | Kamiya et al. |
| 2020/0020412 A1 | 1/2020 | Biberidis et al. |
| 2020/0254713 A1 | 8/2020 | Oldenburg et al. |
| 2020/0266857 A1 | 8/2020 | Hwang et al. |
| 2020/0314916 A1 | 10/2020 | Park et al. |
| 2020/0404569 A1 | 12/2020 | Cho et al. |
| 2021/0061027 A1 | 3/2021 | Da et al. |
| 2021/0206382 A1 | 7/2021 | Nakada |
| 2022/0089181 A1 | 3/2022 | Gross et al. |
| 2022/0126864 A1 | 4/2022 | Moustafa et al. |

FOREIGN PATENT DOCUMENTS

| | | |
|---|---|---|
| EP | 1884908 A2 | 2/2008 |
| EP | 2708463 A1 | 3/2014 |
| WO | 2016/209889 A1 | 12/2016 |

OTHER PUBLICATIONS

European Search Report, corresponding European Patent Application No. 19822274.7, dated Feb. 23, 2022 (9 pp.).

"International Search Report and Written Opinion of the International Searching Authority," issued in connection with Int'l Appl. No. PCT/US2018/065125, dated May 3, 2019 (11 pages).

"International Preliminary Report on Patentability and Written Opinion of the International Searching Authority," issued in connection with Int'l Appl. No. PCT/US2009/034088, dated Aug. 17, 2010 (5 pages).

"International Search Report and Written Opinion of the International Searching Authority," issued in connection with Int'l Appl. No. PCT/US09/34088, dated Dec. 14, 2009 (7 pages).

"International Search Report and Written Opinion of the International Searching Authority," issued in connection with Int'l Appl. No. PCT/US19/36827, dated Oct. 8, 2019 (11 pages).

"International Search Report and Written Opinion of the International Searching Authority," issued in connection with Int'l Appl. No. PCT/US21/48304, dated Dec. 1, 2021 (10 pages).

Airpower Classics; F-5; Dec. 2012; Air Force Magazine; p. 72 (Year: 2012).

Bekdil, B. E., "Turkey Chooses Indigenous Jet-engine Version Basic Trainer Aircraft," Military and Commercial Technology, available at https://thaimilitaryandasianregion.blogspot.com/2017/11/turkey-chooses-indigenous-jet-engine.html, Nov. 23, 2017 (2 pp.).

(56) References Cited

OTHER PUBLICATIONS

Burkhard Domke, MiG-29G Fulcrum-A, Jun. 2000; https://b-domke.de/AviationImages/Fulcrum/3524.html (Year: 2000), 1 page.

Butler, A., "Textron Unveils Scorpion Light Attack, Reece Jet," Aviation Week, available at https://aviationweek.com/defense-space/textron-unveils-scorpion-light-attack-recce-jet, Sep. 16, 2013 (4 pp.).

Call Systems Technology, Products, "AlarmCall Paging," https://www.call-systems.com/products/alarmcall-paging/, dated Jun. 26, 2018 (available at least as early as Jun. 2017), 3 pages.

Colin Cutler, Here's How Leading Edge Slats Get You Off The Ground, Jul. 26, 2018, boldmethod; https://www.boldmethod.com/learn-to-fly/aircraft-systems/here-is-how-leading-edge-slats-work-to-get-you-off-the-ground/ (Year: 2018), 13 pages.

Coyote UAS; https://www.raytheon.com/capabilities/products/coyote; one; available prior to May 30, 2016, 1 page.

Drew, James; USAF reaffirms ambitions T-X sustained-g requirement; Jul. 11, 2015; FlightGlobal.com (Year: 2015), 5 pages.

European Aviation Safety Agency; Type-Certificate Data Sheet; Nov. 17, 2015 (Year: 2015), 12 pages.

European Patent Office, "Supplementary European search report and Search opinion," issued in connection with European Patent Application No. 18923054.3 dated Feb. 15, 2022 (7 pages).

Hartford, Robin, UAT Puts UAVs on the Radar,www.mitre.org/news/digest/aviation/06 08/av uat.html, Jun. 2008, p. 1-3.

Hillaker, H. J., "Design Concept and Rationale . . . for YF-16," Presentation, available at https://www.codeonemagazine.com/f16_article.html?item id=131 1972 (61 pp.).

Hoerner, S. F., et al., "Fluid-Dynamic Lift," Published by Mrs. Liselotte A. Hoerner, 1985 (482 pp.).

Information about Related Patents, Patent Applications, and Patent Office Proceedings see the section below having the same title.

Javelin Advanced Jet Trainer (AJT), Airforce Technology, available at https://www.airforce-technology.com/projects/javelin-ait/, available at least as early as Dec. 18, 2017, (8 pp.).

Lachmann, C; Experiments with Slotted Wings; Nov. 1921; National Advisory Committee for Aeronautics; No. 71 (Year: 1921), 43 pages.

McDonnell Dougla F/A-18 Hornet, Wikipedia, available at https://en.wikipedia.org/wiki/McDonnell_Douglas_F/A-18_Hornet, available at least as early as Dec. 18, 2017 (30 pp.).

Military and Commercial Tech, by Hurjet. dated Nov. 23, 2017. found online [May 7, 2019] https://thaimilitaryandasianregion.blogspot.com/2017/11/turkey-chooses-indigenous-jet-engine.html, 2 pages.

Military Aviation, The Mikoyan MiG-29 'Fulcrum-A' (9-12), 2006 https://sirviper.com/index.php?page=fighters/mig-29/mig-29a (Year: 2006), 7 pages.

Nikolic, Vojin R. "Movable Tip Strakes and Wing Aerodynamics." Journal of Aircraft, vol. 42, No. 6, Nov.-Dec. 2005, pp. 1418-1426, https://doi.org/10.2514/1.4615. (Year: 2005).

Pike, John; F-5 Freedom Fighter/ Tiger; Dec. 27, 1999; FAS Military Analysis Network; https://fas.org/man/dod-101/sys/ac/f-5.htm (Year: 1999), 4 pages.

Poland Developing Grot-2 Airplane With a Motor-Sich Engine, Defense Express, available at https://old.defence-ua.com/index.php/en/news/688-poland-developing-grot-2-airplane-with-a-motor-sich-engine, Mar. 22, 2016 (3 pp.).

Schmitt et al., "Perception-Oriented Cooperation for Multiple UAVs in a Perception Management Framework," 2016 IEEE/AIAA 35th Digital Avionics Systems Conference (DASC), pp. 1-10, 2016 (10 pp.).

Sierra Nevada Corp., TAI Team to Offer Freedom Trainer for T-X, Aviation Week, available at https://aviationweek.com/defense-space/sierra-nevada-corp-tai-team-offer-freedom-trainer-t-x, Dec. 16, 2016 (3 pp.).

Strain, Robert, A Lightweight, Low-Cost ADS-B System for UAS Applications, Distribution Unlimited Case 07-0634, 2007, p. 1-9.

Strain, Robert, Lightweight Beacon System for UAS and Other Aviation Applications, Mitre Corporation, 2007, p. 1-9.

Tetron Unveils Scorpion Light Attack, Recce Jet, Aviation Week & Space Technology, http://aviationweek.com/awin/textron-unveils-scorpion-light-attack-recce-jet (Sep. 16, 2013), 4 pages.

Textron Airland's Scorpion: A Smart Gamble, Center for International Maritime Security, http://cimsec.org/textron-airlands-scorpion-a-smart-gamble/20979 (Jan. 15, 2016), 8 pages.

US Department of Transportation Federal Aviation Administration, Pilot's Handbook of Aeronautical Knowledge, 2016, FAA, Chapter 5 p. 5-21-5-42 https://www.faa.gov/sites/faa.gov/files/2022-03/pilot_handbook.pdf (Year: 2016).

Van Dyk, D. J., "Textron Airland's Scorpion: A Smart Gamble," Center for International Maritime Security, available at https://cimsec.org/textron-airlands-scorpion-a-smart-gamble/, Jan. 15, 2016 (8 pp.).

WAFF—World Armed Forces Forum, post by Nutuk, available at https://www.tapatalk.com/groups/worldarmedforcesfomm/sierra-nevada-corp-tai-team-to-offer-freedom-train-1231764.html, Dec. 16, 2016 (12 pp.).

Wikipedia, Cobra maneuver, Mar. 13, 2022 (Year: 2022), 11 pages.

Wikipedia, Mikoyan MiG-29, Apr. 4, 2022 (Year: 2022), 51 pages.

Wikipedia, Strake (aeronautics), Aug. 9, 2017 (Year: 2017), 3 pages.

World Armed Forces Forum, post by Nutuk. dated Dec. 16, 2016. found online [May 7, 2019] https://www.tapatalk.com/groups/worldarmedforcesforum/sierra-nevada-corp-tai-team-to-offer-freedom-train-t231764.html, 3 pages.

\* cited by examiner

DEVICES AND METHODS TO ATTACH A COMPOSITE CORE TO A SURROUNDING STRUCTURE

TECHNICAL FIELD

The present disclosure relates generally to composite core structure, and more particularly to composite core structure in aerospace applications.

BACKGROUND

Composite core material provides a lighter weight and a higher specific strength alternative to solid fillers and core made of other non-composite materials, particularly in aerospace applications. However, the use composite core material may pose challenges related to connection with surrounding support structure and especially surrounding support structure that is not parallel with the primary axes of the core shape. For example, the use of fillers containing additives to adhere the composite core material to surrounding structure can add unnecessary weight to applications where weight may be prohibitive. Fillers with other additives also may not offer the structural stability necessary for all operating environments including those with exposure to moisture and other chemicals. Many types of connection features can also limit options for passage of electrical lines, hoses, air lines, fuel lines, and the like in or around the composite core material. For example, some fillers and additives can completely encapsulate the various types of lines and hoses thereby preventing inspection and, when necessary, repair. The use of fillers and additives can also increase waste and result in unnecessary fumes or other harmful chemicals to an artisan installing the composite core as well as releasing these chemicals to the environment.

SUMMARY

In one embodiment, a composite core assembly is described. The composite core assembly includes a composite core structure having a length, width and thickness, an internal material interface and at least one attachment rail coupled to the composite core structure. The at least one attachment rail includes a first planar surface and a second planar surface. The second planar surface is arranged at an angle relative to the first planar surface (e.g., arranged transverse to the first planar surface) and the first planar surface arranged parallel to the ribbon direction of the composite core structure. The first planar portion is at least partially integrated into the composite core structure in the ribbon direction and at least a portion of the first planar surface extends beyond a perimeter surface of the composite core structure. The second planar surface is configured to attach to a surrounding support member. The core material typically does not have any net edge facets, or flat edges, positioned next to surrounding structure, and/or may not have a structure arranged parallel to the adjacent support structure for purposes of attachment to the support structure.

In some embodiments, a width of the first planar surface is no greater than a thickness of the composite core structure. In some embodiments, the second planar member is configured to attach to a surrounding support member with at least one fastener. In some embodiments, the first planar member is adhesively bonded to the composite core structure between two or more ribbon corrugations of the composite core structure wherein the two or more ribbon corrugations defining the ribbon direction. The adhesive bonding may include co-curing of the composite core structure with the adhesive used to connect the first planar member to the composite core structure.

In some embodiments, an angle between the first planar member and the second planar member is 90 degrees. In other embodiments, an angle between the first planar member and the second planar member is less than 90 degrees and greater than 10 degrees. In some embodiments, the first planar member and the second planar member are formed as separate parts and couple together to form an assembly when mounted in the surrounding support structure.

In some embodiments, the first planar member and the second planar member are integrally formed a single structure. In some embodiments, the composite core includes a plurality of interconnected cells (e.g., formed by mandrels or other structures individually wrapped with composite material) and at least a second attachment rail is spaced apart from the attachment rail a predetermined number of cells. The composite core assembly may include attachment rails in both longitudinal and width orientations in the composite core.

In some embodiments, the second planar member includes first and second spaced portions spaced apart by a gap or cavity, and a recess is formed the first planar member and aligned with the gap or cavity. In some embodiments, the first planar member and second planar member form a T-shape. In some embodiments, the first planar member and the second planar member form an L-shape.

In another embodiment, a method of assembling a core structure assembly with at least one attachment rail is described. The method includes assembling a first core material on a mandrel and assembling a second core material on a modified mandrel. The method further includes curing the first and second core materials to form a core structure, the composite core structure having at least one gap or cavity formed therein. The method may include inserting the at least one attachment rail into the at least one gap or cavity of the core structure and connecting the at least one attachment rail to the core structure to form a core structure assembly.

In some embodiments, the at least one attachment rails may include first and second attachment rail members and the method may include assembling the first and second attachment rail members to form an attachment rail assembly, and inserting the at least one attachment rail includes inserting the attachment rail assembly into the at least one gap or cavity of the core structure. In some embodiments, wherein inserting the at least one attachment rail into the at least one gap or cavity of the core structure may occur prior to curing the first and second core materials.

In some embodiments, the mandrel and the modified mandrel may have different cross-sectional shapes, and the first and second core materials may be positioned in contact with each other before curing the first and second core materials.

In some embodiments, inserting the at least one attachment rail into the at least one gap or cavity of the core structure may occur after curing the first and second core materials.

In another embodiment, an apparatus with an internal composite core is described. The apparatus includes an upper skin, a lower skin arranged opposite and spaced apart from the upper skin, a forward spar connecting and separating the upper skin and lower skin at a first end, and an aft spar connecting and separating the upper skin and lower skin at a second end opposite the first end. The apparatus may include a first side rib (also referred to as an end surface)

connecting and separating the upper skin and lower skin at a first side, the first side extending from the first end to the second end and a second side rib connecting and separating the upper skin and lower skin at a second side, the second side extending from the first end to the second end. The apparatus includes a composite core assembly positioned between the upper skin and lower skin. The composite structure includes a composite core structure and a plurality of attachment rails coupled to the composite core structure. Each of the plurality of attachment rails includes a first portion integrated into the composite core structure and a second portion connected to the first portion and arranged outside of the composite core structure. The second portion is arranged at an angle relative to the first portion and the second portion is connected to at least one of the forward spar, the aft spar, the first side rib, and the second side rib.

In some embodiments, the plurality of attachment rails may include separate attachment rails connected to each of the forward spar, the aft spar, the first side rib, and the second side rib. In some embodiments, the apparatus may be a wing torque box.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
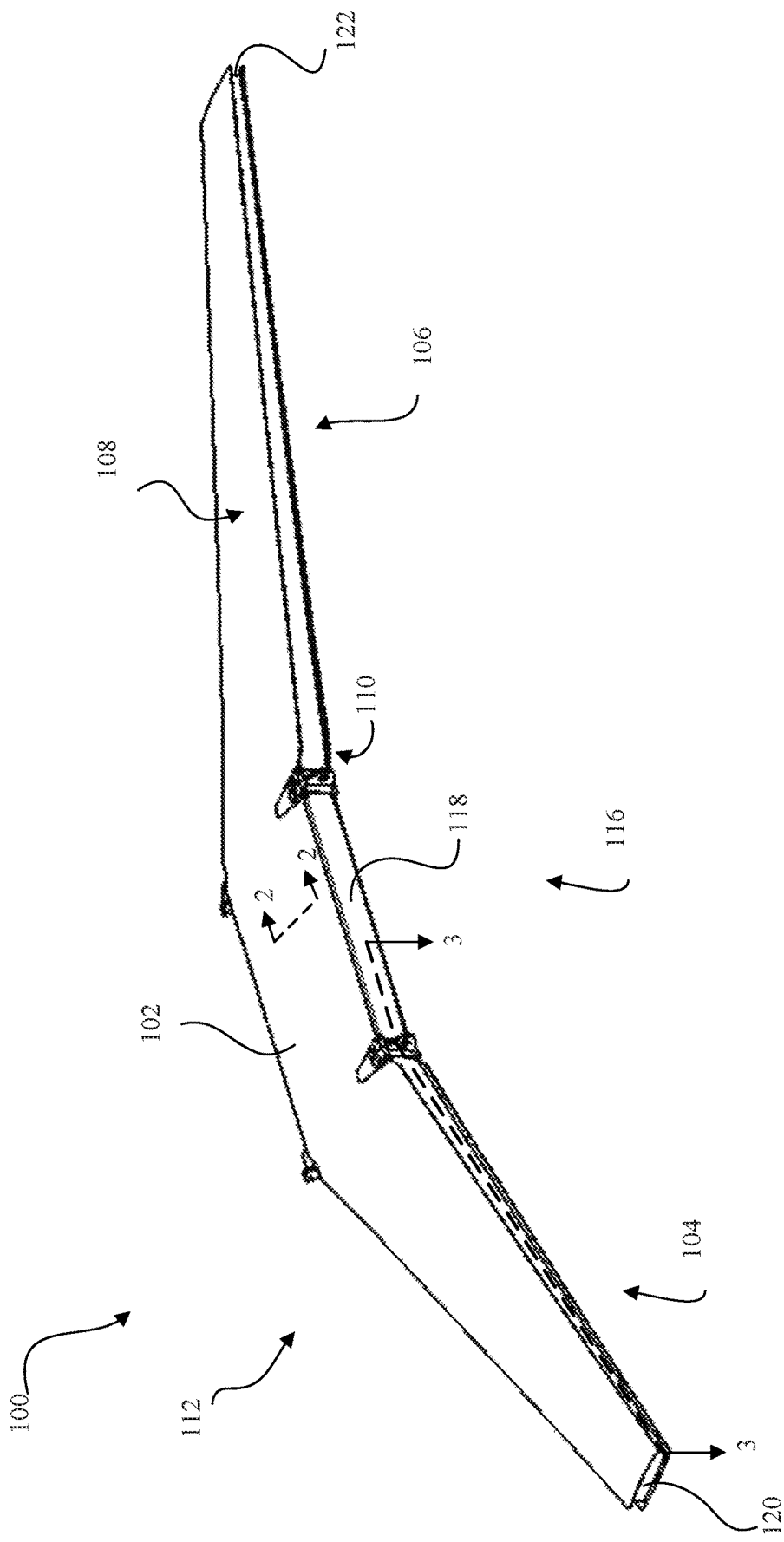
FIG. 1 is a perspective view of an exemplary wing box structure in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the forms disclosed. Rather, the instant disclosure covers all modifications, equivalents, and alternatives falling within the scope of the appended claims.

DETAILED DESCRIPTION

Some aerospace applications use composite core technology to add stability and strength to various portions of the aircraft without adding a significant amount of weight, or provide similar stability and/or strength as other materials and/or structures without increasing the amount of weight. In some cases, the use of composite core technology can both decrease weight and increase stability and strength. A composite core structure is typically made from plies of continuous fiber reinforced material. A composite core can include a ribbon-based or a wrap-based architecture. Conventional methods of attaching core material to the surrounding structure add weight and cost as well an increase in cost of manufacturing. In some applications, the core material does not have any net edge facets, or flat edges, positioned next to surrounding structure, and/or may not have a structure arranged parallel to the adjacent support structure for purposes of attachment to the support structure. Fillers may attach a non-uniform surface of the composite core to the surrounding support structure. Such fillers may include foaming adhesives, epoxy, glass bead fillers, and the like to bridge the gap or cavity between the surrounding support structure and the composite core. These fillers have a number of disadvantages, such as adding undesirable weight, particularly in aerospace applications.

FIG. 1 illustrates an example of a potential structure which may utilize the embodiments described herein. The potential structure pictured is a wing torque box 100. Other examples of structure include, but are not limited to, wind turbine blades, rotor blades, wing structures, and other structures which benefit from low weight applications. Some of these applications are outside of the aerospace field. The wing torque box 100 may include a center box section 102, a left-wing section 104, and a right-wing section 106. The wing torque box 100 may be bound by an upper wall or skin 108 and a lower wall or skin 110 opposing the upper skin 108. A forward end 112 of the wing torque box 100 is bound by a forward spar (not shown) and an aft end 116 of the wing torque box 100 is bound by an aft spar 118. The forward spar may be arranged opposite the aft spar 118. The wing torque box 100 may also include first and second side ribs 120, 122 arranged at opposite ends of the wing torque box 100.

The upper and lower skins 108, 110 are supported by an internal structure which may provide structural integrity. For example, the wing torque box 100 may bend without the skins 108, 110 buckling. This may prevent the wing torque box 100 from collapsing and may also limit aerodynamic or flight safety issues that might otherwise occur. In some embodiments, the skins 108, 110 may be stiffened with longitudinal and lateral elements. The internal stiffening supports may include core material comprising composite core structure and the elimination of both lateral and longitudinal internal stiffening elements.

Figure 2:
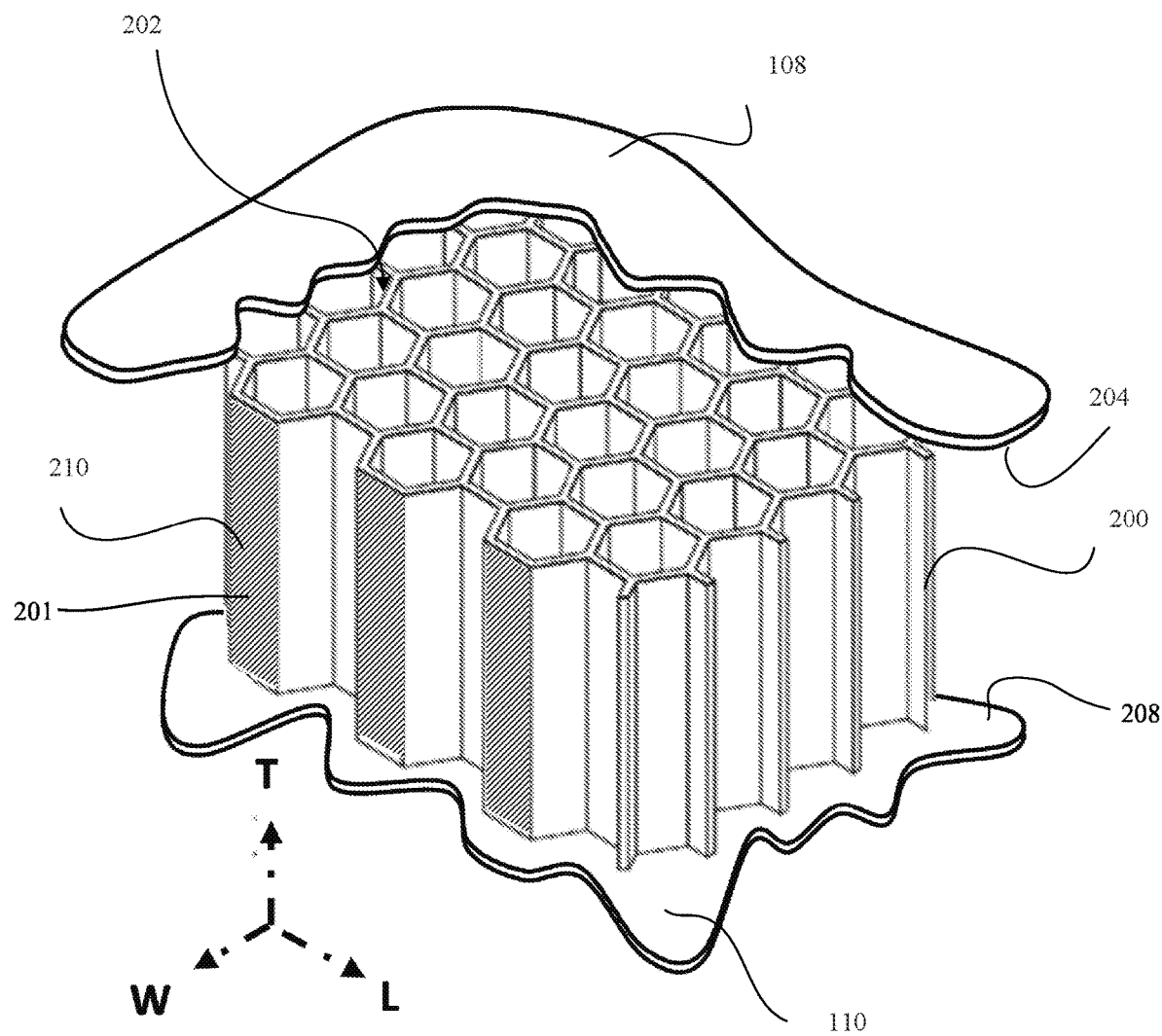
FIG. 2 is a perspective cut-away view of an exemplary section of the wing box structure of FIG. 1 taken along lines 2-2.

For example, FIG. 2 illustrates a perspective cut-away view of the wing torque box 100 of FIG. 1 along lines 2-2. The interior of the wing torque box 100 may comprise a composite core structure 200 between the upper and low skins 108, 110. The core structure 200 may have an upper side or surface 202 contoured to match an interior surface 204 of the upper skin 108. In some embodiments, the core structure 200 may have a bottom side or surface (not shown, but arranged opposite the upper surface 202) to match an interior surface 208 of the lower skin 110. The contouring may be dependent on the support structure. For example, the contouring may differ between a wing box structure and a wind turbine blade.

The core structure 200 may comprise a ribbon corrugation. The ribbon corrugation, as will be discussed later, may have a ribbon direction. In the embodiment shown, the ribbon direction may align with a length L of the core structure 200. The width W of the core structure 200 may be determined based at least in part on the number of ribbons attached together. In another embodiment, the core structure may comprise a collection of individually material wrapped cells. An overall thickness T of the core structure 200 may vary along the width W and length L of the core structure 200. For example, if the upper skin 108, and in some embodiments lower skin 110, vary in contour along an outer surface of the surrounding structure, the thickness T of the core structure 200 may vary as well. In other embodiments, if the upper skin 108 and/or lower skin 110 are substantially planar with a constant distance between them, then the thickness T of the core structure 200 may be consistent.

The core structure 200 may be a composite core structure. In the embodiment show, the core structure may have a hexagonal-cell shape. The cells include cell walls 201 extending between the upper skin 108 and the lower skin 110 and may have a size, for example, of about ¼ inch to about 2 inches wide. In some embodiments, the hexagonal cell-shape may be larger than about 3 inches or smaller than about ¼ inch. The core structure 200 may further include a net edge core. Net edge core may be manufactured such that the location of individual cells is planned for in the final assembly. For example, the distances between end facets 210 may be predetermined such that an end facet 210 may mate with an edge of the surrounding structure and an opposing edge facet (not shown) of the core structure 200 may mate with the opposing edge of the surrounding structure.

Figure 3:
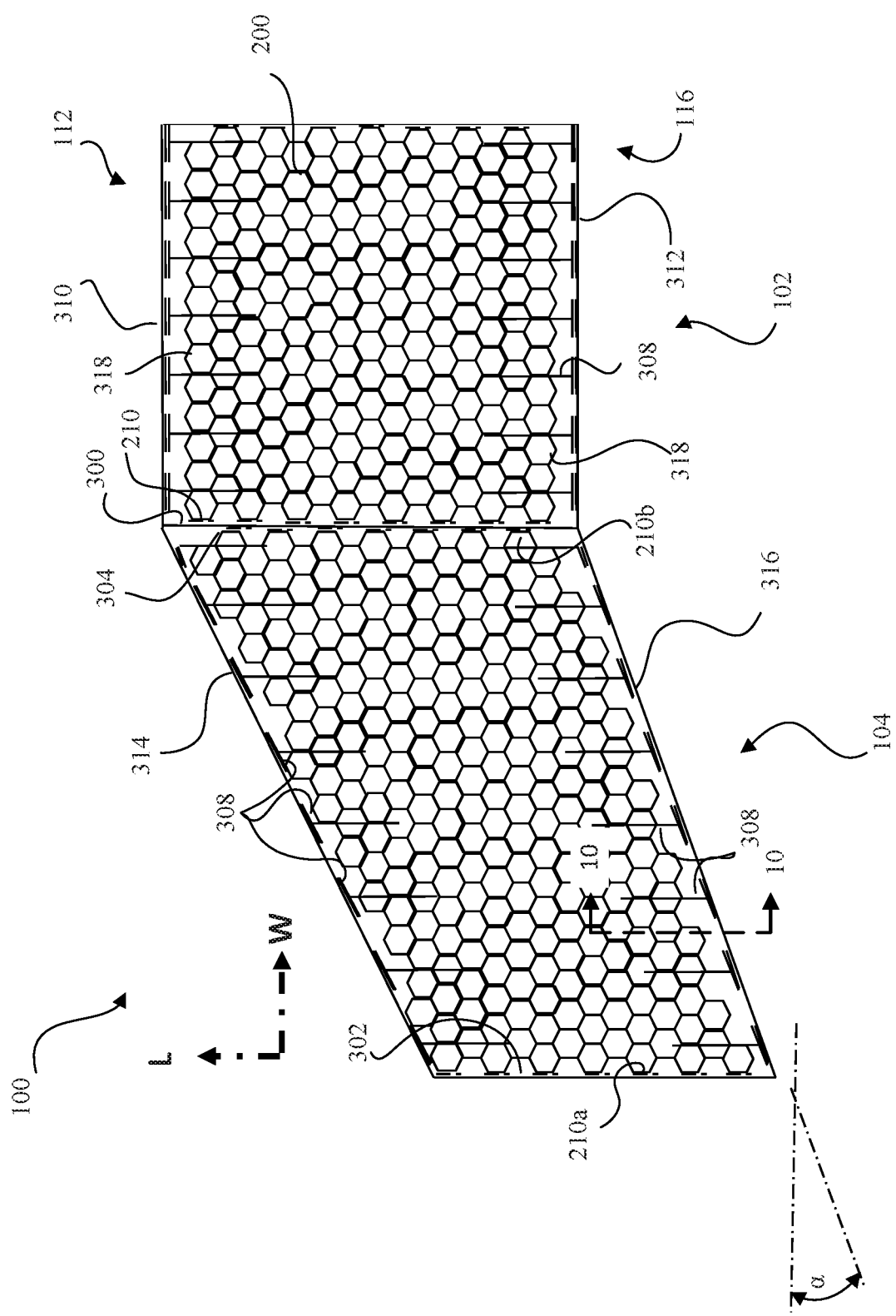
FIG. 3 is a top view of a cross-section of the wing box structure shown in FIG. 1 taken along lines 3-3.

For example, as shown in FIG. 3, the end facet 210 mates against a wall or surface 300 of the torque box 100. The torque box 100 in this example is merely exemplary as the core structure 200 may be used in a variety of applications as discussed previously. In the left-wing section 104 of the torque box 100, an end facet 210a mates with an end surface 302 of the left-wing section 104. End surface 302 may be referred to as a side rib, rib or mounting surface. An opposing end facet 210b mates with an end surface 304 of the left-wing section 104. The right-wing section (e.g., right-wing section 106 in FIG. 1) may have a similar structure.

At the forward end 112 and aft end 116 of the wing torque box 100, the core structure 200 may not have any flat surfaces (e.g., end facets) to mate with surrounding walls of the torque box 100 along the length L of the core structure 200 (e.g., referred to as surrounding support structure). Therefore, in some embodiments, one or more rails 308 may attach the core structure 200 to the wing torque box 100. The rails 308 may enable the core structure 200 to provide strength and rigidity while reducing weight as compared to other attachment means. The rails 308 may be integrated into the core structure 200 during fabrication of the core structure 200 or may be inserted afterwards. Both methods will be described herein.

The rails 308 also enable the core structure 200 to attach to non-uniform surfaces. For example, in the center box section 102, the forward and aft walls 310, 312 (alternatively referred to as side walls) are substantially perpendicular to the surface 300. Not all mating surfaces in all applications will be perpendicular. For example, the forward and aft walls 314, 316 of the left-wing section 104 are not perpendicular to the end surfaces 302, 304. Rather, the swept portion of the wing torque box 100 is offset at an angle α from the aft wall 312. The rails 308 may connect the core structure 200 to these offset walls 314, 316.

Rails 308 can also be used to attach the core structure 200 to surrounding surfaces that may be perpendicular to the length L of the core structure 200, provided the ribbon direction is aligned with the length L. The core edges 318 have insufficient bonding area to communicate forces from the core structure 200 to the surrounding walls 310, 312. The rails 308 may bridge between the core edges 318 and the forward and aft walls 310, 312.

Figure 4:
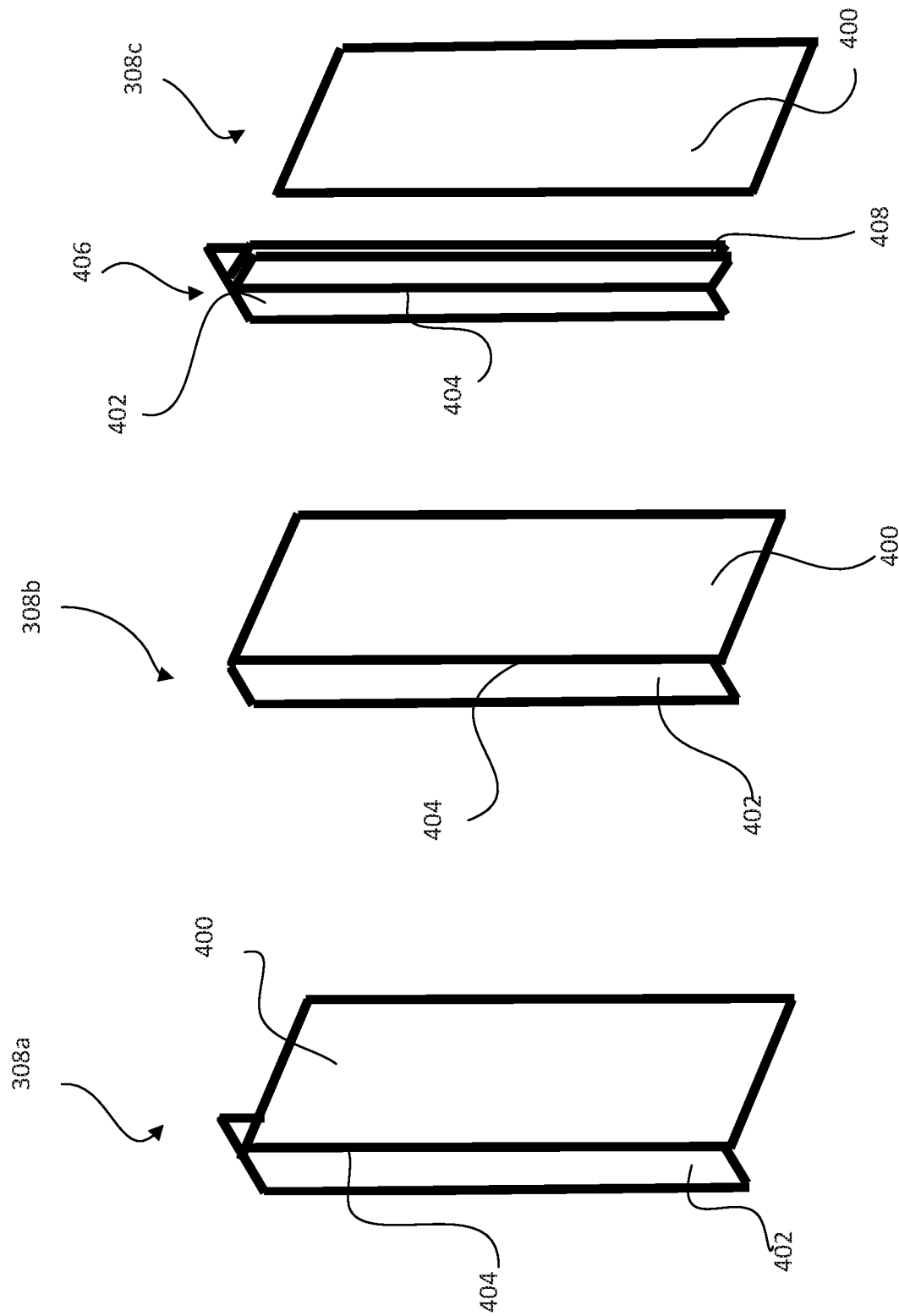
FIGS. 4A-4C show attachment rail embodiments in accordance with the present disclosure.

FIGS. 4A-4C illustrates different embodiments of the rail 308. FIG. 4A illustrates a tee rail 308a. FIG. 4B illustrates an angle rail 308b. FIG. 4C illustrates a blade rail 308c. The tee rail 308a may provide a symmetric load path between the core structure 200 and the surrounding support surface. This may provide a high strength bond between the core structure 200 and the surrounding support surface. In some embodiments, if mounting space is constrained such as near a corner of a surrounding support surface or other intrusion-impeding space available, the angle rail 308b may be used to mate the core structure 200 to the surrounding support surface. The blade rail 308c may ease fabrication of the rail 308c into the core structure 200 during fabrication of the core structure.

The rails 308 may comprise the same material as the core structure 200. For example, the rails 308 may be the same prepreg used to build core structure 200 and form surrounding structure. In some embodiments, the rails are precured before use in assembly. In some embodiments, the rails 308 may also be molded via a pultrusion process using reinforcing fibers.

Each rail 308a, 308b, 308c has a substantially planar core attachment leg 400. The core attachment leg 400 may have a width approximately equal to the thickness of the core structure 200. In other embodiments, the core attachment leg 400 may have a width that is less than the thickness of the core structure 200. Each rail 308a, 308b, 308c may have a mounting surface 402. The mounting surface 402 may be substantially planar and approximately the same width as the core attachment leg 400. In some embodiments, the mounting surface 402 may be substantially narrower than the core attachment leg 400. The moment in the rail may be reacted back into the cores structure and skins (e.g., skins 108, 110, FIGS. 1 & 2). The mounting surface 402 is shown arranged perpendicular to the core attachment leg 400, but the mounting surface 402 may be transverse the core attachment leg 400 and potentially offset at a predetermined angle greater or less than 90 degrees. The moment be a direct result of the eccentricity between the surrounding structure and a centroid of the interface surface with the core. Typically, only shear in the T direction is reacted by mounting surface 402.

The tee rail 308a and the angle rail 308b may have a joint 404 connecting the core attachment leg 400 and the mounting surface 402. The joint 404 may be a rigid joint with an angle predetermined when the rails 308a, 308b are manufactured. In other embodiments, the joint 404 may allow for some movement such that the angle may be set when the core structure 200 is assembled into surrounding support structure. In other embodiments, the joint 404 may be a flexible joint such as a hinge, spring joint, linkage, or the like. The flexible joint configuration may be useful, for example, when an angle between the ribbon direction and mating surface varies along a width of the core structure 200.

The blade rail 308c may have a separate mounting device 406. The mounting device 406 may have a mounting surface 402 and a joint 404. The joint 404 may form a Pi joint, so named because the mounting device 406 forms a shape similar to the letter Pi, Π, in the Greek alphabet. The Pi joint may comprise a groove 408 formed in the mounting surface 402 to accept the blade rail 308c.

Figure 5:
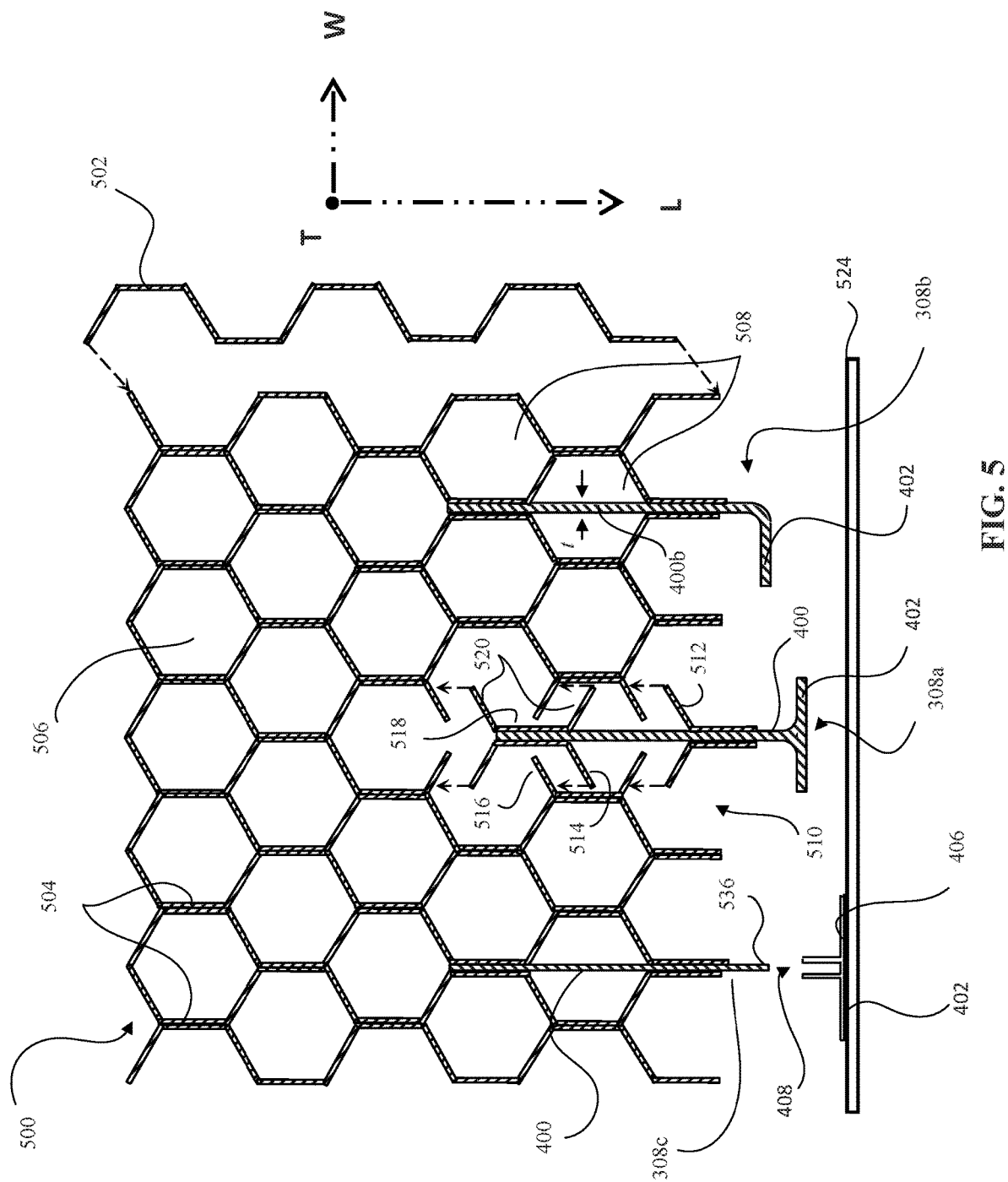
FIG. 5 is a top view of a cross-section of another exemplary core structure with variations of the attachment rails in accordance with the present disclosure.

FIG. 5 illustrates a ribbon-based hexagonal core structure 500 with the three different rails 308 incorporated therein. The core structure 500 may consist of separate ribbon corrugations 502. In one method, the core structure 500 may be constructed by placing composite material over mandrels (e.g., a hexagonal-shaped mandrel) or other tool components. In some embodiments, the mandrels may be symmetric. The composite material may then be constrained on the mandrel during curing cycle (e.g., an oven cycle) to cure the composite material. For example, the composite material may consist of any available prepreg material including epoxies, cyanite ester, polyimides, or lower end vinyl esters, and phenolic resin, with glass, carbon, quartz, and/or fibers. The curing cycle may consist, for example, of placing the tooled ribbon corrugation in an oven to cure the material. Curing the material may consist of hardening the material to form a rigid, structural ribbon. The curing cycle may include a thermosetting chemical reaction resulting in the creation of polymer chains and cross linking across ply boundaries. The mandrels may be extracted after the composite material is consolidated and cured. In some embodiments, the interfaces between the ribbon corrugations 502 are cured simultaneously with the ribbon corrugation 502 to form hexagonal cells 506. This may enable crosslinking in the resin occurs and a ribbon joint 504 may be formed. In another embodiment, the ribbon corrugations 502 may be separately cured and adhesively bonded together. For example, the ribbon corrugations 502 may be bonded together using cured composite pieces with a hot film. The film may have a certain thickness and softens and cures during a cure cycle.

The core attachment leg 400 of the rails 308*a* 308*b*, 308*c* may be aligned parallel with the length direction L of the core structure 500. In one embodiment, the angle rail 308*b* may be constructed prior to insertion between the ribbon corrugations 502. For example, the angle rail 308*b* may be inserted between the ribbon corrugations 502 as a step of or prior to the curing process of the core structure 500. In this method, the core attachment leg 400*b* may become a part of the ribbon joint 504. In another embodiment, if the core structure 500 is fabricated by adhesively bonding the ribbon corrugation together, the core attachment leg 400*b* may be prepared for bonding and adhesive placed between the core attachment leg 400*b* and the ribbon corrugation 502, for example after the core structure 500 is cured. In some embodiments, the preparation may include sanding down the surface of the core attachment leg 400*b* or applying one or more solvents on the core attachment leg 400*b* to better accept adhesive and bond to the ribbon corrugation 502. Other preparation methods may include grit blasting, peel ply, and the like.

In some embodiments, one or more hexagonal cells 506 may be modified to accept a thickness t of the core attachment leg 400. For example, the thickness t of the planar leg of attachment rail integrated into the composite core 400 (e.g., attachment leg 400*b*) may cause the hexagonal cells 506 and ribbon corrugation 502 to misalign as the core structure 500 is being manufactured. In some embodiments, a disrupting thickness t may be 1 to 5 plies thick, which may be in the range of about 0.0075 inches to about 0.0375 inches thick depending on the thickness of the individual plies. In this embodiment, modified hexagonal cells 508 may be incorporated into the fabrication stage to accept the planar leg of attachment rail integrated into the composite core 400 (e.g., attachment leg 400*b*). A modified cell 508 may be fabricated using modified mandrels. A modified mandrel may have a different cross-sectional shape or size as compared to the standard mandrel used for forming cells 506.

In another embodiment, the core attachment leg 400 may be integrated into the core structure 500 after the hexagonal core has been constructed. For example, a ribbon joint 504 may be removed from the core structure 500 in a location 510 where a rail 308 is to be incorporated. Partial ribbons 512, 514 may be formed onto the core attachment leg 400 of, in this embodiment, the tee rail 308*a*. The partial ribbons 512, 514 may complete the trimmed hexagonal cells 516. In some embodiments, the partial ribbon 512 may complete more than one trimmed hexagonal cell 516. For example, the partial ribbon 512 may have an edge facet 518 and two legs 520 to complete the trimmed hexagonal cell 516. The modified core attachment leg 400 may be bonded into place. In some embodiments, the modified core attachment leg 400 may be moved into place using a spring action of the cantilevered portions of the trimmed hexagonal cell 516 to push back against the legs 514 of the partial ribbon 512.

In another embodiment, a rail 308, e.g., comprising composite material similar to the core structure 500, may be cured with the core structure 500 using the adjacent ribbon corrugations 502 and a partial modified mandrel. In some embodiments, as illustrated, the rail 308 may be a blade rail 308*c*. The connection between the blade rail 308*c* and the ribbon corrugations 502 may then be formed during the curing process. Other rail configurations may also be cured with the core structure 500 such as the tee rail 308*a* and the angle rail 308*b*.

Figure 6A:
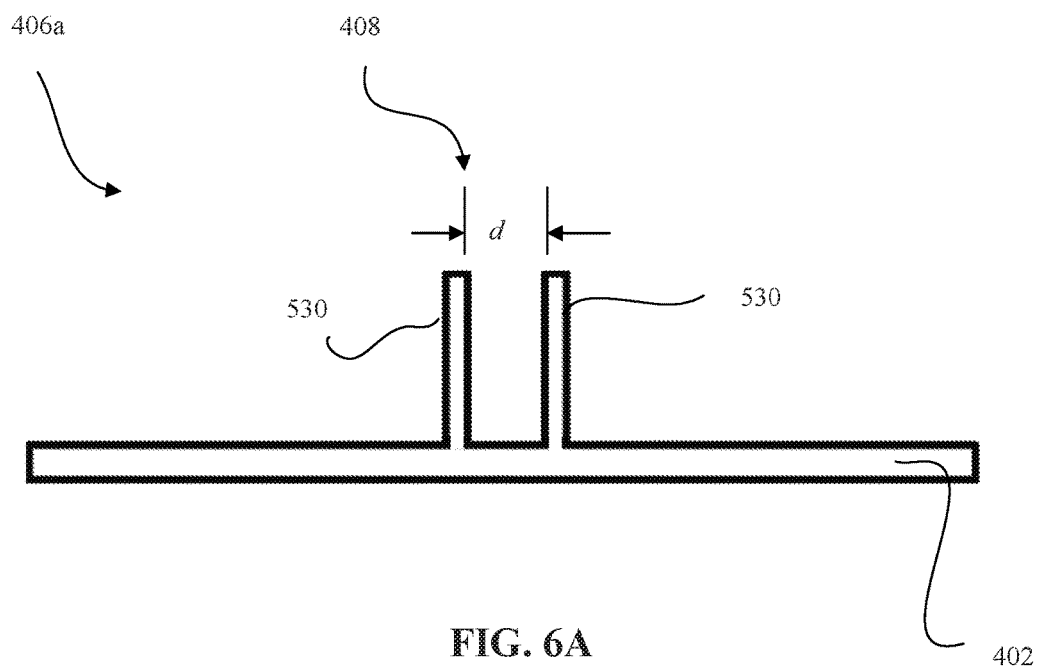
FIGS. 6A and 6B illustrate an embodiment of a mounting device of one embodiment of an attachment rail in accordance with the present disclosure.
Figure 6B:
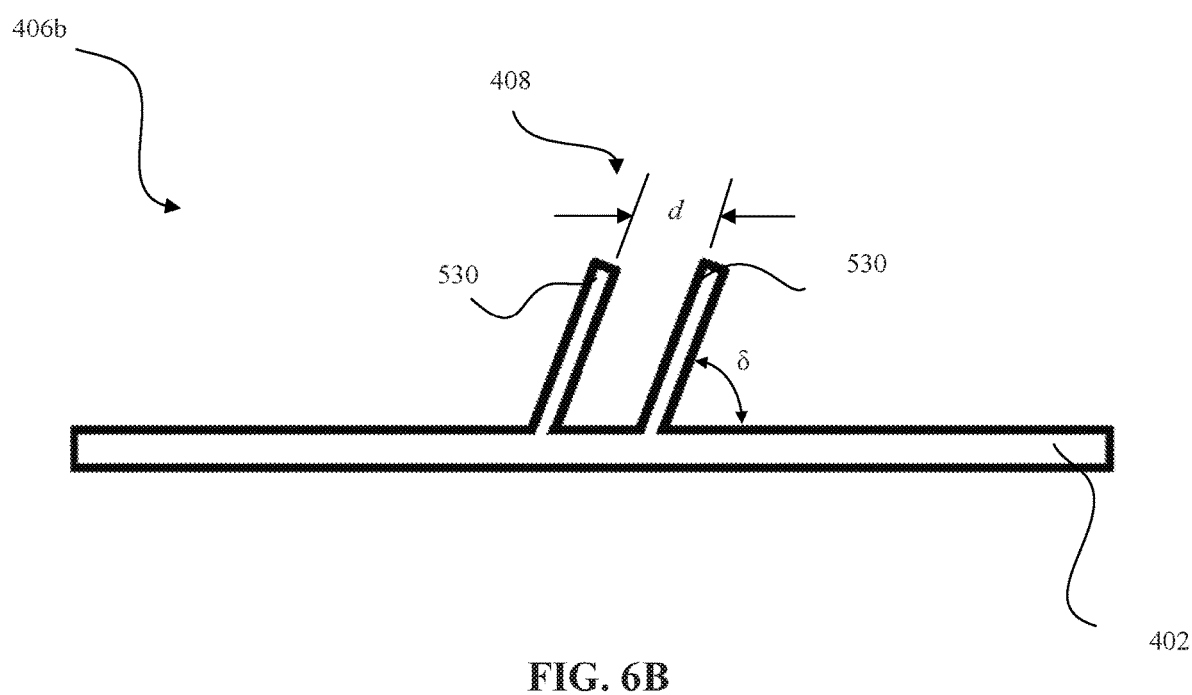

The mounting surface 402 may be secured to the surrounding support surface 524 using, for example, adhesive, fasteners, clips, or other coupled devices or methods. In some embodiments, a mounting device 406 may be adhered to the surrounding support surface 524. As shown in FIGS. 6A and 6B, the mounting device 406 may have a mounting surface 402 with two prongs 530 transverse to the mounting surface 402 forming the groove 408. The two prongs 530 may be substantially perpendicular to the mounting surface 402 or may be offset at an angle δ to the mounting surface 402. The prongs 530 may have a predetermined distance d between them forming the groove 408. The predetermined distance d may allow the groove 408 to accept an end 536 of the blade rail 308*c* (see FIG. 5). The end 536 of the blade rail 308*c* may be, for example, pressed, adhered (e.g., using room templast material), fastened or otherwise coupled the mounting device 406 via the groove 408. In some embodiments, a depth of the groove 408 may be determined by a length of the prongs 530 The prong length may be extended or increased to reinforce the end 536 of the blade rail 308*c* and prevent bending of the blade rail 308*c*.

Figure 7:
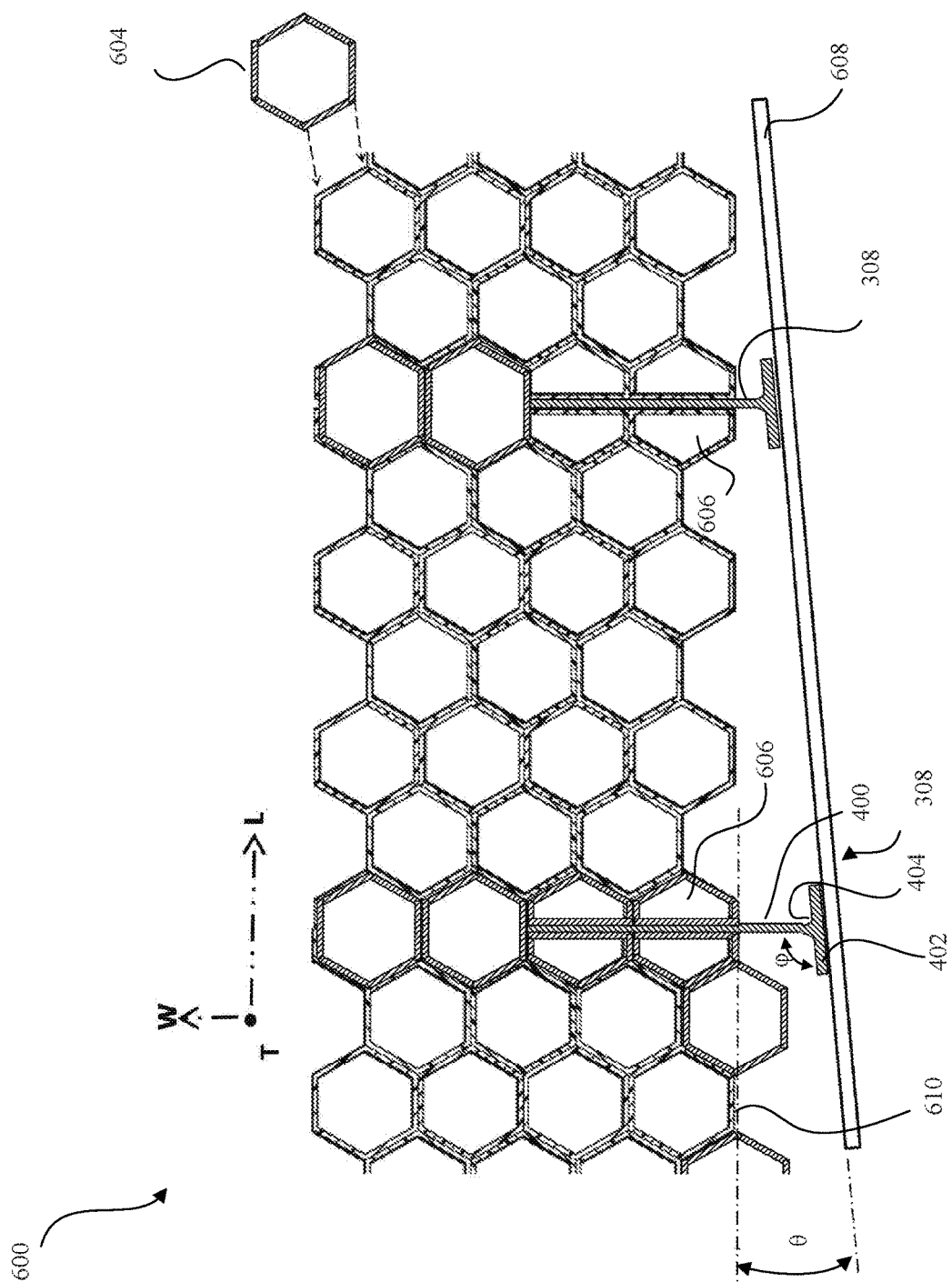
FIG. 7 is a is a top view of a cross-section of another exemplary core structure with attachment rails in accordance with the present disclosure.

FIG. 7 is a wrap-based hexagonal core structure 600 with rails 308 incorporated therein. The core structure 600 may be separate wrapped polygons 604 assembled together to form the core structure 600 structure. The polygons 604 may be formed by wrapping or winding composite material around a hexagonal mandrel and then assembling the mandrels in a desired pattern. The assembled mandrels may then be cured (e.g., in an oven cycle) to form the composite core structure 600. The curing process may cause the resin in the composite to cross-link and bond or otherwise adhere the separate polygons 604 together. In another embodiment, the polygons 604 may be formed and cured separately and then adhered or otherwise joined together to form the core structure 600.

The rails 308 may be incorporated into the core structure 600. In some embodiments, modified mandrels may form modified cells 606. The rails 308 may be assembled with the modified cells 606 prior to the cure process such that the rails 308 and core structure 600 will be cured concurrently. In another embodiment, the modified cells 606 and core structure 600 may be cured without the rail 602 inserted. A modified mandrel or tool die may be placed in the rail location to maintain dimensional integrity during the curing process. In some embodiments, the polygons 604, modified cells 606, and rails 308 may be separately cured and then assembled using the various techniques described herein. In another embodiment, the core structure 600 may incorporate extended cells to accept the rails 308. For example, modified mandrels may form extended cells, or cells that are longer in a one or more directions thereby forming an elongated hexagon shape. The extended cell may then be split into sections (e.g., in half) to form the modified cell 606.

The rails 308 may connect the core structure 600 to surrounding structure 608. The surrounding structure 608 may be a left-wing section (e.g. left-wing section 104) as seen in FIG. 1 or may be another surrounding structure as noted herein. In some embodiments, the surrounding structure 608 may not align with the core structure 600. For example, as seen in FIG. 7, the surrounding structure 608 may be offset at an angle θ from a facet edge 610 of the core structure 600. This may prevent the core structure 600 from directly coupling to the surrounding structure 608 without the use of fillers or adhesives. Instead, the mounting surface 402 of the rail 308 may couple the core structure 600 to the surrounding structure 608. The mounting surface 402 may be offset from the core attachment leg 400 to mate with the surrounding structure 608 by an angle φ. In some embodiments, the offset angle φ may be predetermined and incorporated into the manufacture of the rail 308. In other embodiments, the rail 308 may comprise a somewhat flexible material and the offset angle φ may be set during assembly of the apparatus. In yet another embodiment, a hinge or other flexible joint may be present at the joint 404. The flexible joint 404 may enable the angle φ to be customized during the assembly process.

Figure 8:
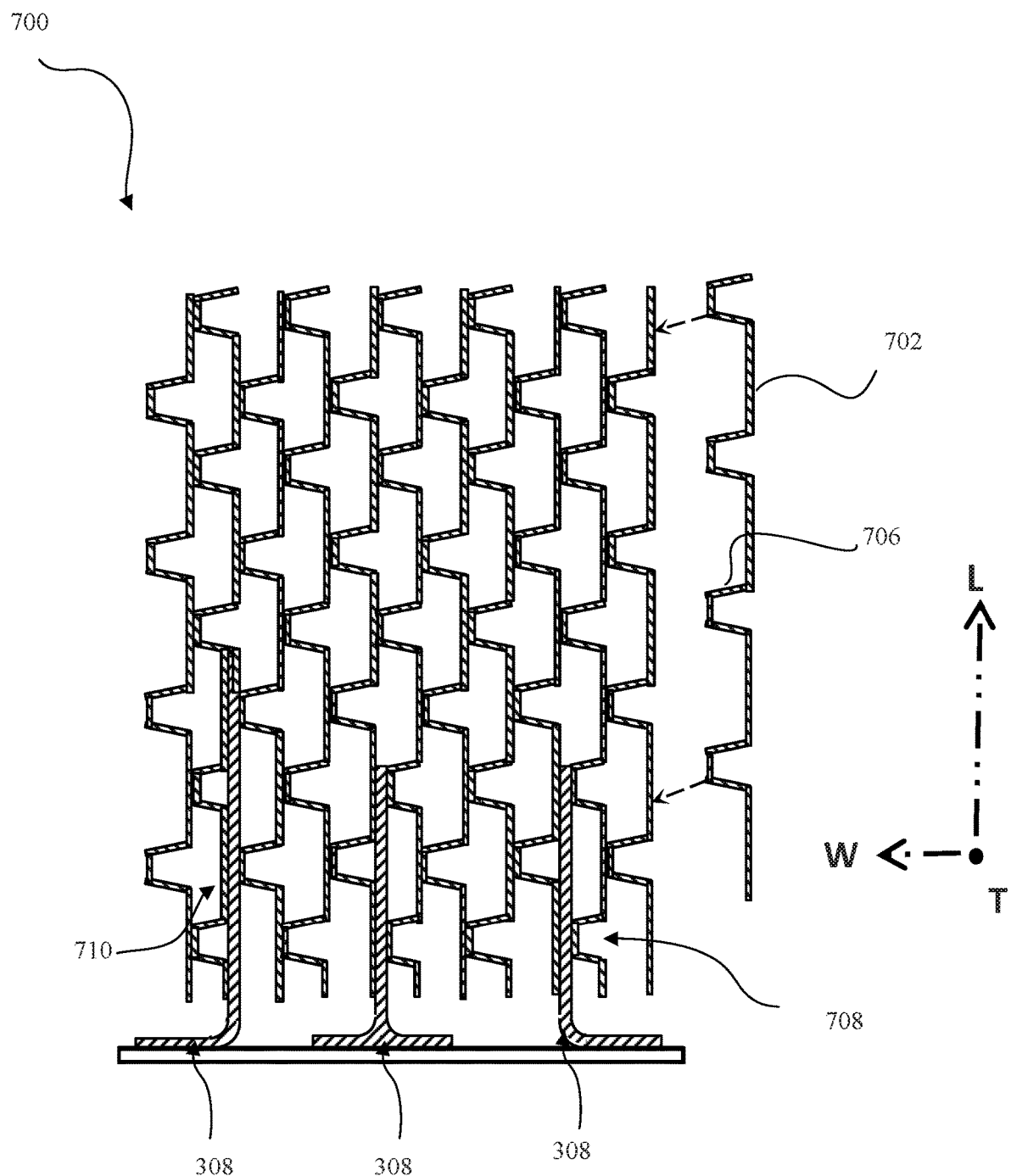
FIG. 8 is a top view of a cross-section of another exemplary core structure with attachment rails in accordance with the present disclosure.

FIG. 8 depicts a ribbon-based flex hat core structure 700 with rails 308 arranged parallel to the core ribbon direction. The core structure 700 may be configured similarly to the ribbon-based hexagonal core structure 500 except the flex hat-shaped ribbon corrugations 702 are a different shape. The flex shaped core is typically cut with a band saw in parallel slices and then shaped or formed to a contour. In an application such as a through depth core wing box as shown in FIGS. 1, 2 and 3, the core is profiled with a multi axis mill to represent the contour and the flexing capability of the configuration is not used. The shear strength of a flex hat core shape as compared to an equivalent density hexagonal core is typically higher because of the number of folds per unit cell. In some embodiments, there are 10 folds or adjacent folded support points for the flex hat configuration as compared to 6 for the hexagonal configuration. In some embodiments, the flex-hat shaped ribbon corrugation 702 may be modified to incorporate one or more rails 308. For example, the hat portion 706 of the ribbon corrugation 702 may be shortened to form a modified top hat cell 708. Modified brim cells 710 may also be used to incorporate one or more rails 308 into the core structure 700. The rails 308 may be incorporated during fabrication of the core structure 700 or may be inserted after the core structure 700 has been assembled.

Figure 9C:
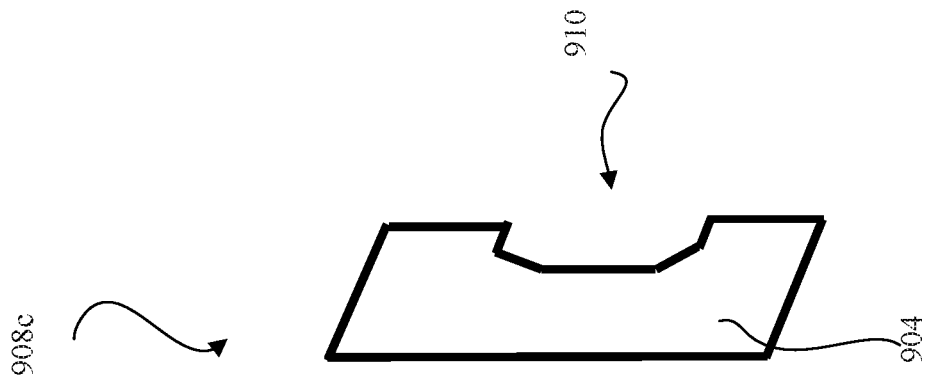
FIGS. 9A-9C show attachment rail embodiments in accordance with the present disclosure.
Figure 9B:
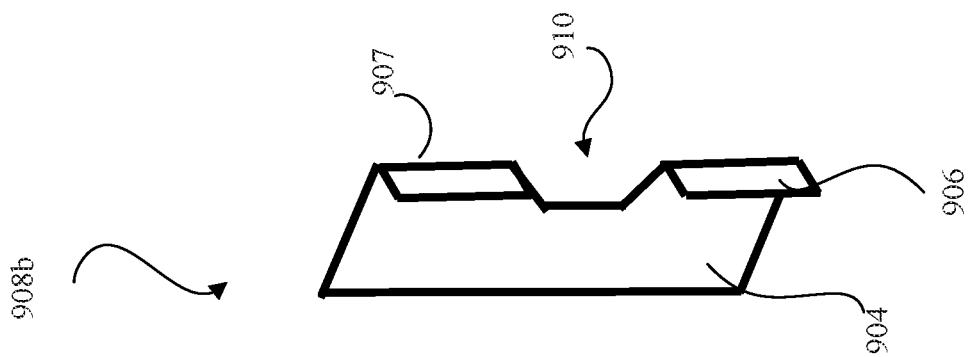
Figure 9A:
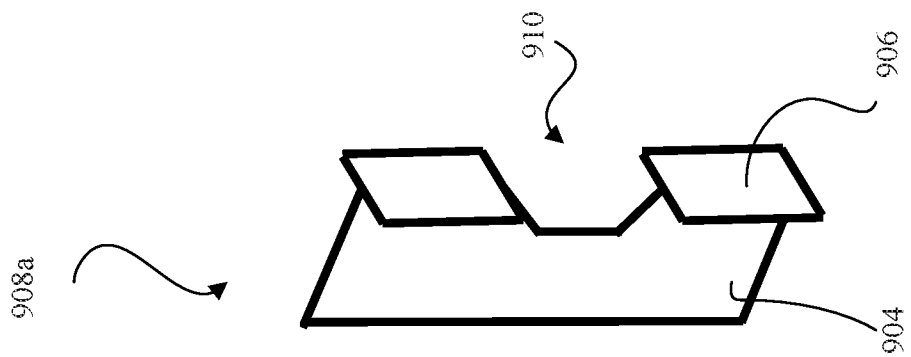

FIGS. 9A-9C illustrates an alternative rail 908 embodiment. The rails 908a, 908b, 908c shown may be similar to the rail 308a, 308b, 308c described previously. FIG. 9A illustrates a tee rail 908a. FIG. 9B illustrates an angle rail 908b. FIG. 9C illustrates a blade rail 908c. A mounting device (not shown) for the blade rail 908c may be similar to the mounting device 406 described with reference to FIGS. 4-6. The rail 908 may include a core attachment leg 904, mounting surface 906 and joint 907. The rail 908 may additionally have a notch 910. The notch 910 may interrupt the mounting surface 906 and create a void in the core attachment leg 904. The notch 910 may vary in one or more of size, shape and location along the mounting surface 906. The notch may provide additional space between the core and the adjacent structure.

Figure 10:
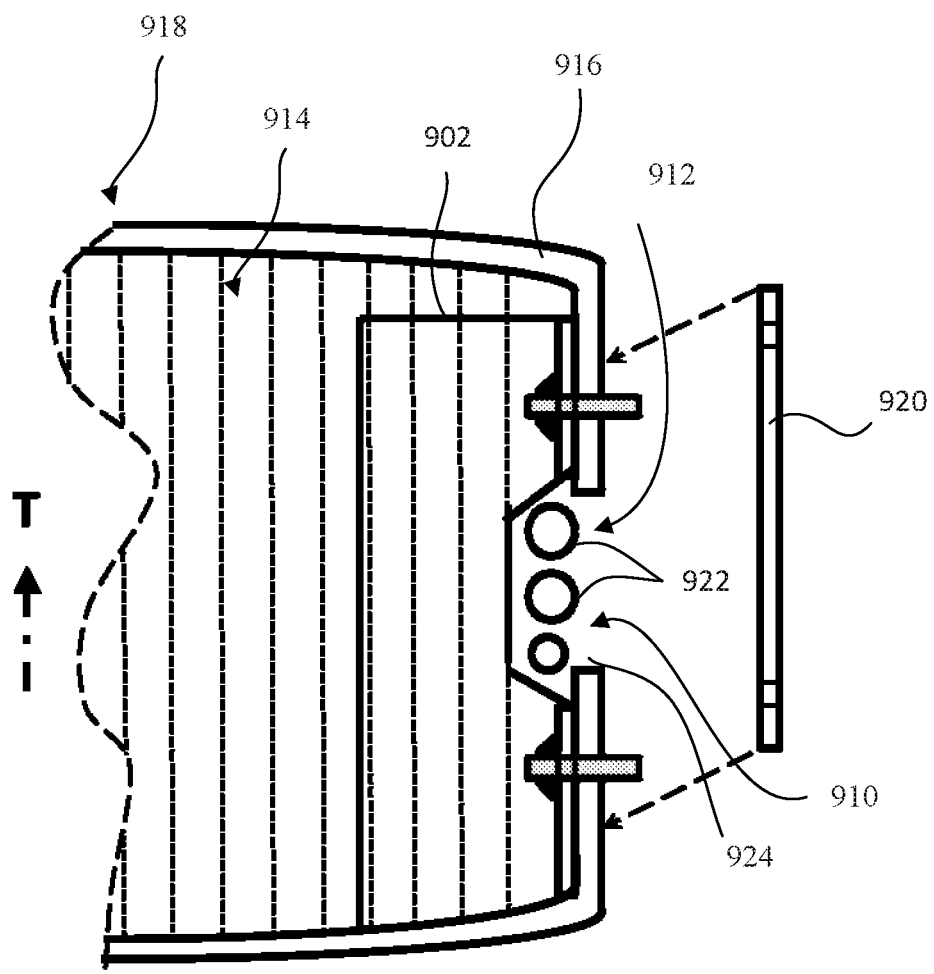
FIG. 10 is a cross-sectional view of the wing box structure shown in FIG. 3 taken along lines 10-10.

For example, as shown in FIG. 10, the notch 910 opens a volume 912 in the space between the core 914 the adjacent structural member 916 surrounding the core 914. In the embodiment shown, the notch 910 houses various objects 922 near the surrounding structure 916. The various objects 922 may include mount system lines, hydraulic lines, wiring, and similar features depending on the end use of the apparatus 918.

This volume 912 contained inside the apparatus 918 may be accessible with a removable section 920 of the surrounding structure 916. The removable section 920 may reveal an opening 924 in the structure 916. The interrupted mounting surface 906 may attach to the structure 916 on either side of the opening 924. The removable section 920 may snap into place, or may be screwed, fastened, or otherwise removably affixed to the structure 916. The notched rails 902 combined with the removable panel 920 may enable a person to inspect the inside of the apparatus 918 and also inspect the various objects 922 placed within the notch 910.

The rail configurations described herein may be used with core designs not depicted herein including, for example, over-expanded OX core, reinforced stabilized core, double flex core, and noise reducing core. The rail configurations can also be incorporated into a number of cores made from different materials as discussed herein.

Unless otherwise explained, any technical terms used herein have the same meaning as commonly understood by one of ordinary skill in the. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described herein. The term "comprises" means "includes." All publications, patent applications, patents, and other references mentioned herein are incorporated by reference in their entirety for all purposes. The materials, methods, and examples are illustrative only and not intended to be limiting.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. Often, the width of an object is transverse the object's length.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A composite core assembly comprising:
   a composite core structure including a plurality of interconnected cells, the composite core structure including an upper side, a lower side, and a perimeter edge extending between the upper side and the lower side, the plurality of interconnected cells including cell walls extending between the upper side and the lower side, the composite core structure further comprising two or more ribbon corrugations, the two or more ribbon corrugations defining a ribbon direction; and
   at least one attachment rail coupled to the composite core structure, the at least one attachment rail including a first planar member and a second planar member arranged at an angle relative to the first planar member, the first planar member being at least partially integrated into the composite core structure, the first planar member arranged parallel to the ribbon direction of the composite core structure;
   wherein the first planar member extends outward from the perimeter edge of the composite core structure.

2. The composite core assembly of claim 1 wherein the composite core assembly is part of a turbine blade, rotor blade, or wing structure.

3. The composite core assembly of claim 1 wherein the first planar member and the second planar member are integrally formed as a single structure.

4. The composite core assembly of claim 1 wherein the first planar member and the second planar member are separate components coupled together.

5. The composite core assembly of claim 1
   wherein the at least one attachment rail includes a first attachment rail and a second attachment rail each of which includes a first planar member and second planar member arranged at an angle relative to the first planar member, the first planar member of each of the first attachment rail and the second attachment rail being at least partially integrated into the composite core structure;
   wherein the first planar member of each of the first attachment rail and the second attachment rail extends outward from the perimeter edge of the composite core structure; and
   wherein the first attachment rail and the second attachment rail are spaced apart on the perimeter edge of the composite core structure.

6. The composite core assembly of claim 1 wherein the first planar member and the second planar member form a T-shape or an L-shape.

7. The composite core assembly of claim 1 wherein the plurality of interconnected cells include cells having a cross-sectional shape that is hexagonal or hat-shaped.

* * * * *